United States Patent [19]

Bienvenu et al.

[11] 3,950,730
[45] Apr. 13, 1976

[54] APPARATUS AND PROCESS FOR THE RAPID PROCESSING OF SEGMENTED DATA

[75] Inventors: Jacques Michel Jean Bienvenu; Michel Lecuyer, both of Paris, France

[73] Assignee: Compagnie Honeywell Bull (Societe Anonyme), Paris, France

[22] Filed: Sept. 19, 1973

[21] Appl. No.: 398,737

[30] Foreign Application Priority Data
Sept. 26, 1972 France .................................. 72.34019

[52] U.S. Cl. ............................................. 340/172.5
[51] Int. Cl.² ........................................... G06F 13/00
[58] Field of Search .............................. 340/172.5

[56] References Cited
UNITED STATES PATENTS

| | | |
|---|---|---|
| 3,222,649 | 12/1965 | King et al. ........................ 340/172.5 |
| 3,546,677 | 12/1970 | Barton et al. .................... 340/172.5 |
| 3,624,616 | 11/1971 | Patel ................................ 340/172.5 |
| 3,654,621 | 4/1972 | Bock et al. ...................... 340/172.5 |
| 3,670,310 | 6/1972 | Bharwani et al. ............... 340/172.5 |

Primary Examiner—Gareth D. Shaw
Assistant Examiner—Michael C. Sachs
Attorney, Agent, or Firm—Lewis P. Elbinger; Ronald T. Reiling

[57] ABSTRACT

Apparatus and process for the rapid processing of the data in a data processing system having a segmented memory, wherein descriptors representing the characteristics of the segments are employed in retrieving from memory and processing each segment, and wherein means is provided for the rapid locating of the descriptors for the segments most frequently utilized.

16 Claims, 7 Drawing Figures

FIG-1

FIG-2 UEX

FIG-4A-UCT

FIG-4B-UTA

FIG. 5

APPARATUS AND PROCESS FOR THE RAPID PROCESSING OF SEGMENTED DATA

BACKGROUND OF THE INVENTION

This invention relates to an apparatus and a process for the rapid processing of segmented data.

In prior art data processing systems segmenting of the memories, the central processor memory, as well as the auxiliary memories, has been implemented by assigning an identification number to each memory segment and by storing the characteristics of each segment (address, length, access rights, etc.) termed "segment descriptor" in a particular register. The set of these descriptors constitutes a general table of segment descriptors. This arrangement has the advantage of simplifying the task of the programmer for whom the central processor memory and the auxiliary memories then form a unit which may be considered as a single memory.

In a system organized in this manner, when the address calculating mechanism furnishes the identification number of a segment, the corresponding descriptor must be located in the general table in order to provide for controlling the access rights, verifying if the length of the segment is sufficient for the capacity demanded by the program, and locating such segment by the address held in the descriptor.

When the capacity of the memory unit is very large, the number of segments and, therefore, of descriptors is very large. In such instance the selection of a descriptor from the general table is performed by an approach termed "hierarchizing", which increases considerably the time for locating a descriptor. The preformance of such systems is therefore limited.

Accordingly, it is the object of this invention to reduce the time for selecting segment descriptors in a data processing system having segmented memories.

Another object of this invention is to increase the preformance of a data processing system having segmented memories.

SUMMARY OF THE INVENTION

The apparatus of the present invention providing for the rapid processing of segmented data is applicable to a data processing system, wherein the memory unit is divided into $m$ addressable segments, each segment being assigned an identification number, wherein the characteristics of each segment are stored in a respective segment descriptor forming part of a general descriptor table, and wherein the descriptors are adapted to be called successively, in any order, by means of an address calculating device placed under control of a supervisory program. The invention is principally characterized by comprising essentially an auxiliary table unit, having evolving contents, for $n$ descriptors, $n$ being relatively small compared to $m$, and a control unit, having evolving contents, and having two banks of indicators. The two banks consist of a bank of presence indicators for validating the use of the $n$ descriptors contained in the auxiliary table unit at any moment in the processing of the supervisory program and a bank of reference indicators for identifying, among others, the last A different segments called. These last a different segments are called during the addressing, which addressing may be represented as of rank $(np) + A$ of the supervisory program (A being less than or equal to $n$ and $p$ being greater than or equal to 1). The invention also comprises an enabling unit for steering the entry of the descriptors into the auxiliary table unit under control of the contents of the control unit, and a transfer network between, on one hand, the auxiliary table unit, the control unit and the enabling unit, and, on the other hand, the processing unit of the system, such transfer network being enabled by commands emitted in sequence by the command unit of such processing unit.

In accordance with the invention, the supervisory process of the claimed apparatus is pricipally characterized by comprising essentially the steps of: defining a number $n$ of segment calls which is small in relation to $m$ and which has a value approaching the frequency of repetition of the calls made in the course of a program to the first segments called at the start of such program; and storing the descriptors of the segments called in an auxiliary table unit of $n$ descriptor registers by orienting the evolution of such table according to two phases:

a first phase, termed the loading phase, in the course of which the storing of the descriptors of the $n$ first different segments called is made in the registers of rank 1 to $n$ of the auxiliary table unit respectively; and, a second phase, termed the replacement phase, during which each segment called (a) causes the "marking" of the corresponding descriptor of the auxiliary table unit if it is present in such table, and (b) causes the replacement by the corresponding descriptor of the first descriptor not "marked" counting from register $n$ if such corresponding descriptor is not present in the auxiliary table unit.

BRIEF DESCRIPTION OF THE DRAWING

The invention will be described with reference to the accompanying drawing, wherein.

DESCRIPTION OF THE PREFERRED EMBODIMENT

Figure 1:
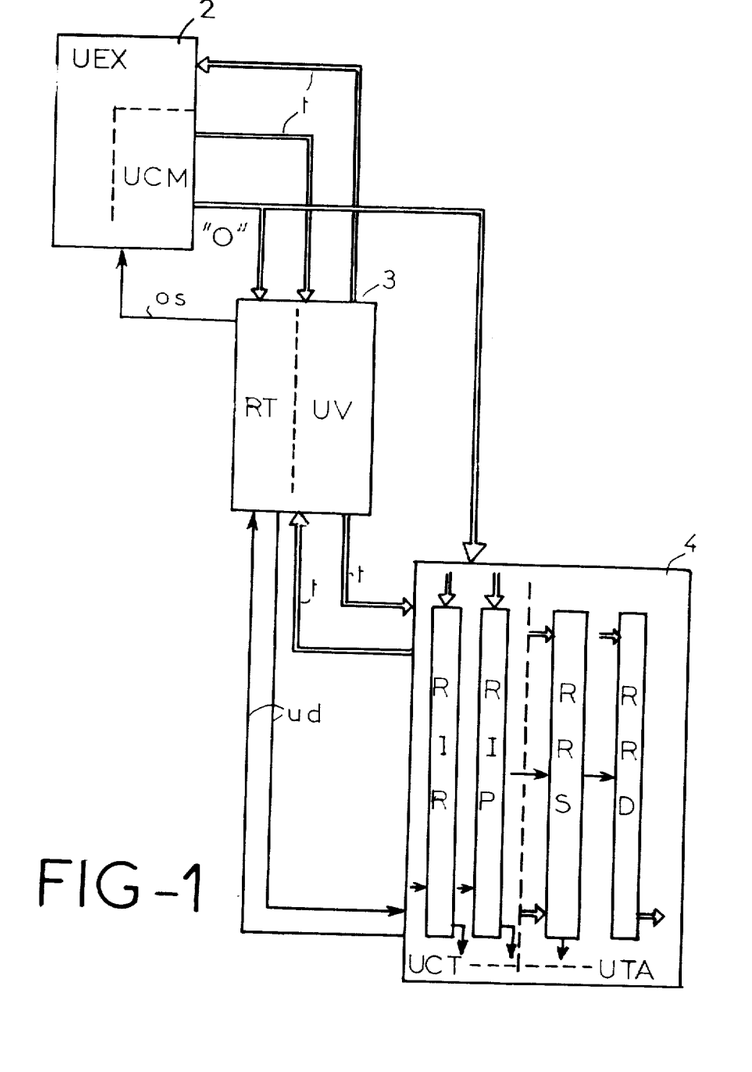
FIG. 1 is a block diagram of the components comprising the apparatus of the invention.

The diagram of FIG. 1 comprises three blocks, wherein:

block 2 represents the processor UEX of the system and its command unit UCM, block 4 represents an auxiliary table unit UTA and a control unit UCT of the apparatus of the invention, and block 3 represents an enabling unit UV and a transfer network RT of the apparatus.

As is known, command unit UCM delivers orders "O" in sequence; however, according to the results obtained from the execution of these orders, the sequence may undergo branching to another sequence (symbolized by the connection os in FIG. 1).

Auxiliary table unit UTA comprises two banks of registers; namely, a descriptor register bank RRD providing for the storage of $n$ descriptors (which have been described previously herein) and an identifier register bank RRS providing for the storage of the identification numbers of the segments whose characteristics are contained in the $n$ descriptors stored at each moment of the process.

Control unit UCT comprises two banks; namely, a presence indicator bank RIP which, as mentioned previously herein, validates the use of the $n$ descriptors loaded into bank RRD during the course of a process, and a reference indicator bank RIR which provides for identifying the last A different segments called during the course of an addressing, which addressing may be represented as of rank (np) + A. The connection of control unit UCT with enabling unit UV provides for the evolution of the contents of descriptor register bank RRD.

The connections $t$ symbolize the information transfers and the connections ud symbolize the enabling signals transferred.

Figure 2:
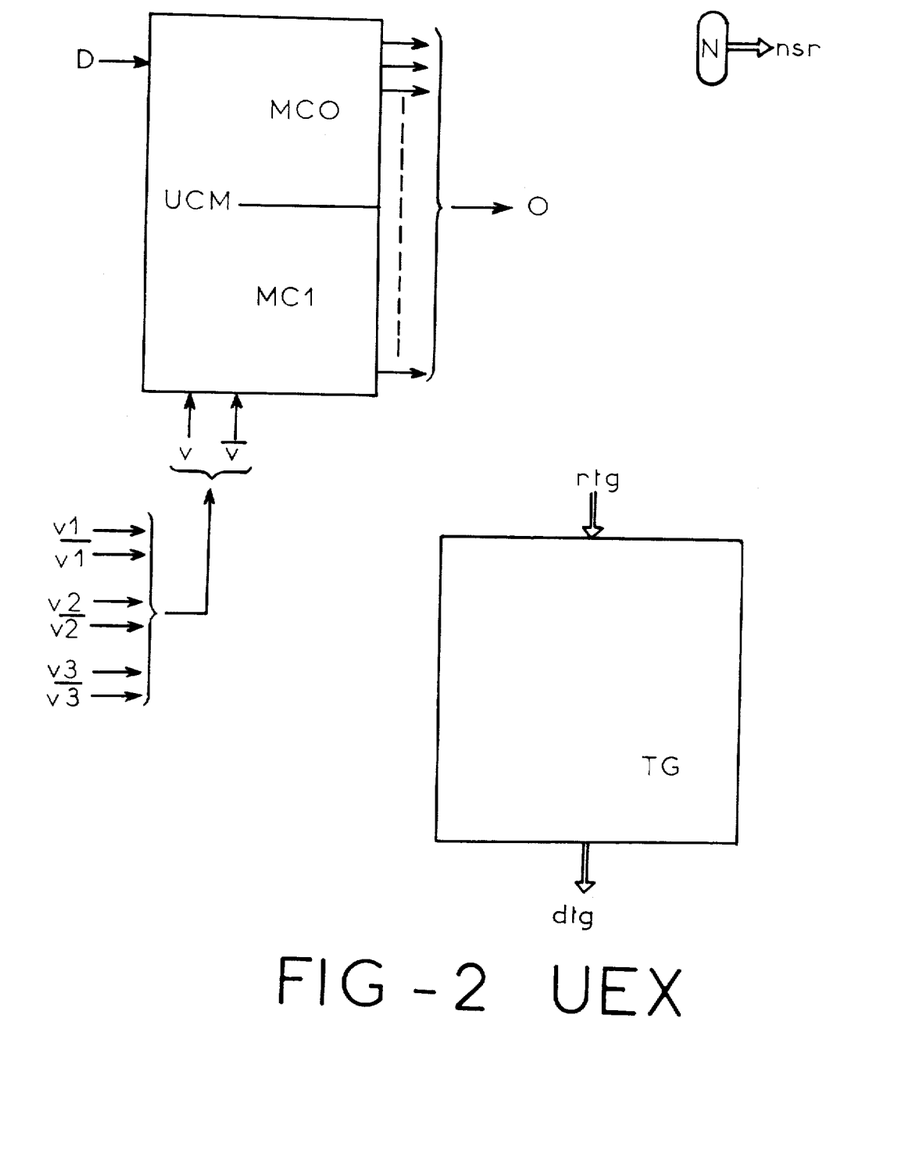
FIGS. 2, 3A, 3B, 4A and 4B are block diagrams, in more detail, of the components shown in FIG. 1.

FIG. 2 represents, in more detail, the processor UEX shown in FIG. 1. Only certain components of processor UEX have been represented in FIG. 2. Command unit UCM, as is known, comprises two fixed memory blocks MCO and MC1. Command unit UCM, after receiving a starting pulse D, delivers in sequence orders "O" issuing from one or the other of memory blocks MCO or MC1. The choice of the order to be delivered by command unit UCM, from between the two orders issuing, is made through the intermediary of a circuit (not shown) controlled by either the signal v or the signal $\overline{v}$. This arrangement enables branching of the sequence of the orders. The sequence of orders which define the process of the invention may undergo three branchings (controlled by signal groups v1-$\overline{v1}$, v2-$\overline{v2}$ and v3-$\overline{v3}$).

Processor UEX also comprises a general table of descriptors TG which, when it receives a segment identification number rtg, delivers the corresponding descriptor dtg, which holds the characteristics of the segment.

FIG. 2 also shows that processor UEX comprises a source of information signals nsr which represent the identification numbers N of the segments to which there must be successive access during a process. These segment mumbers N are furnished by the address calculating mechanism.

Figure 4A:
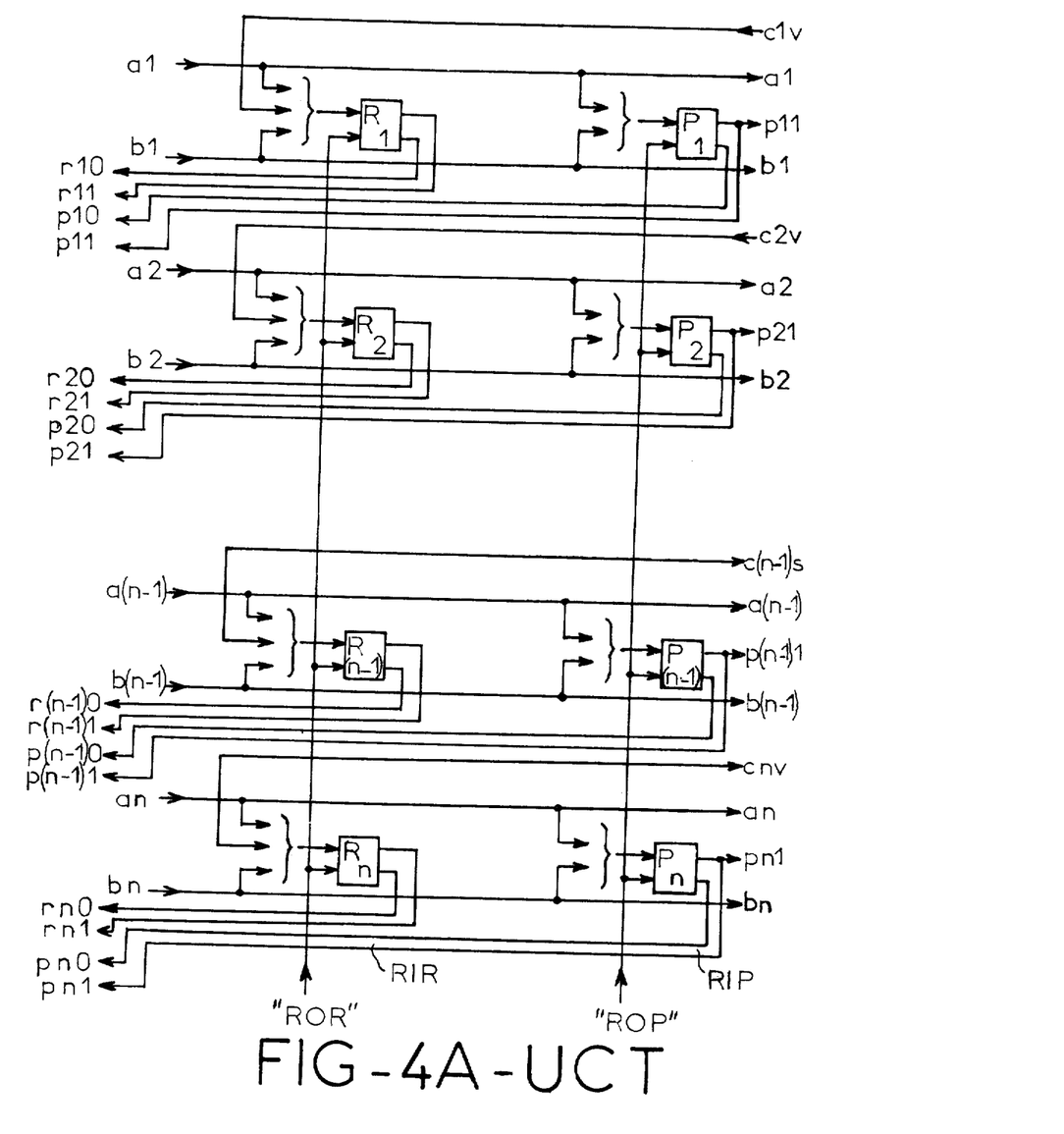
Figure 4B:
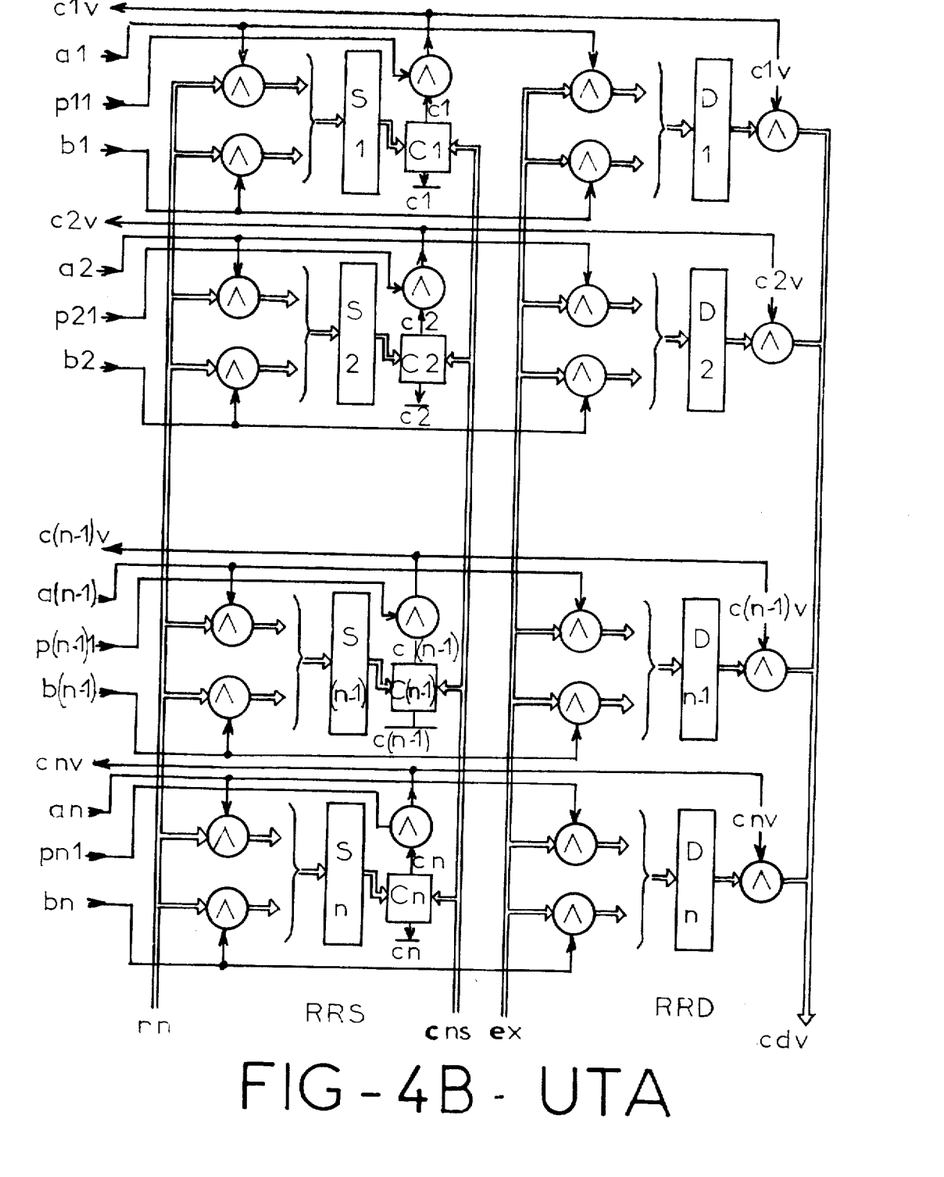

FIG. 4B represents auxiliary table unit UTA which, as has been mentioned previously herein, comprises a descriptor register bank RRD and an identifier register bank RRS.

FIG. 4A represents control unit UCT which comprises a presence indicator bank RIP and a reference indicator bank RIR.

Descriptor register bank RRD, FIG. 4B, primarily comprises $n$ registers D1-Dn. Each register of bank RRD (which, during the process, contains the characteristics of the segment to which it is temporarily assigned) is associated with:
one of registers S1-Sn of bank RRS (registers S1-Sn contain the identification numbers of the related segments),
one of presence indicators P1-Pn of bank RIP, and
one of reference indicators R1-Rn of bank RIR.

The descriptor contents cdv of a descriptor register, for example register D1, are delivered to the process through an AND-gate (without reference numeral, but illustrated immediately to the right of the corresponding one of registers D1-Dn), which is enabled by the condition signal clv initiated by a comparator C1. Each of registers S1-Sn is associated with one of comparators C1-Cn. When the information cns (representing a segment identification number) that is delivered simultaneously to the $n$ comparators C1-Cn is identical to the contents of one of the identifier registers, for example, register S1, the corresponding comparator Ci delivers a signal ci representing a match, for example, comparator C1 delivers the condition signal c1. However, the condition signal clv, which is initiated as a result of the generation of condition signal c1, is only delivered by an AND-gate (without reference numeral, but illustrated immediately above the comparator C1) when the gate is enabled by a condition signal p11. Condition signal p11 is supplied by presence indicator P1.

Each presence indicator and each reference indicator, FIG. 4A, can be operative in one or the other of two states representing respectively the binary numbers 1 and 0. The state in which each of these indicators is operating is represented by the presence of one or the other of two condition signals on the output leads of the indicators (for example, the signals p11 and p10 for indicator p1). The indicators enter into one or the other of their two states under the control of respective signals (for example, for indicator p1, the signal 1p1 and the signal delivered by the order "ROP"). It is to be noted that the order "ROP" resets the $n$ presence indicators to the state 0, and similarly, that the order "ROR" resets the $n$ reference indicators to the state 0.

Figure 5:
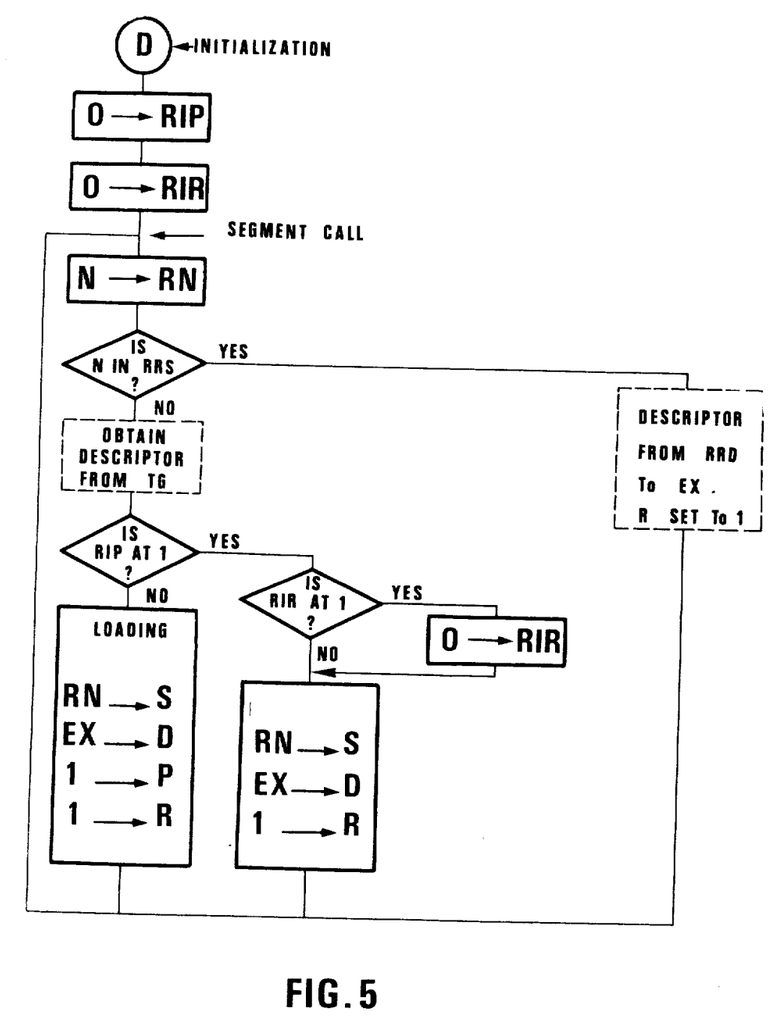
FIG. 5 is a flow chart of the process of the invention which exploits the capabilities of the apparatus realized in accordance with the invention.

The operation of the apparatus of the invention and the supervisory process claimed for such apparatus will now be explained by reference to FIGS. 2, 3A, 3B, 4A, 4B, and to the control flow chart of FIG. 5.

The starting pulse D furnished by processor UEX triggers the starting of command unit UCM, FIG. 2, which supplies at the beginning two first order; namely, the order "ROP" which resets all of presence indicators P1-Pn to the state 0, and the order "ROR" which resets all of reference indicators R1-Rn to the state 0.

Figure 3A:
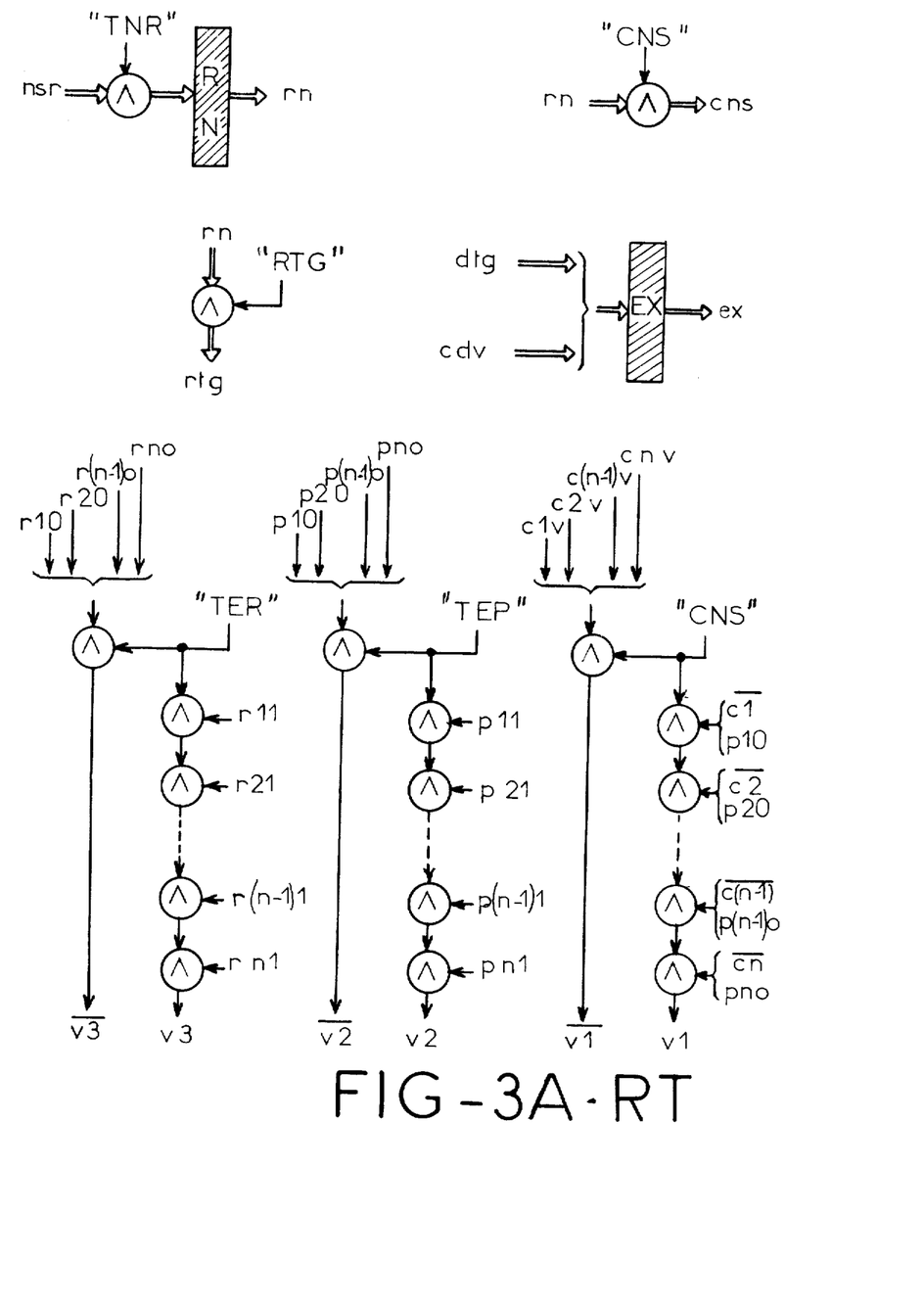

The next order "TNR" enables the transfer of the identification number N of the first segment called by the program into a waiting register RN (FIGS. 2 and 3A).

The next order is a comparison order "CNS" for comparing the segment identification contents (rn) of register RN with the segment identification number contents of each of the registers of identifier register bank RRS. In effect, the order "CNS" enables the transfer of the contents of register RN (FIG. 3A) in parallel to one set of input leads of each of comparators C1-Cn. At this stage in the execution of the program, even if one of the registers S1-Sn contains the identification number of the segment called, the AND-gates (without reference numerals, but illustrated immediately above comparators C1-Cn) associated with comparators C1-Cn are not enabled to transfer any of the signals c1-cn because the condition signals p11-pn1 are not present, so that no descriptor can be furnished to the process (FIG. 4B). The order "CNS" is also applied to a network of AND-gates (lower right portion of FIG. 3A), which at this time are enabled by the condition signals p10-pn0, causing issuance of the condition signal v1. Signal v1 is delivered to command unit UCM ("NO", in flow chart of FIG. 5), causing the sequence of the commands to branch to a search of general descriptor table TG.

The ensuing search order "RTG" causes the transfer, FIG. 3A, into general descriptor table TG of the segment identification number held in register RN (in form of information signals rtg). The corresponding descriptor contents of table TG are transferred, as information signals dtg, into a process register EX (FIG. 3A).

The next order "TEP" is an order for testing the state of presence indicator bank RIP. If all of presence indicators P1–Pn are in state 1, the order "TEP" leads to the generation (lower central portion of FIG. 3A) of the condition signal $\overline{v2}$ ("YES", in flow chart of FIG. 5). On the other hand, if any one of the presence indicators is in state 0, the order "TEP" leads to the generation of the condition signal $\overline{v2}$ ("NO", in flow chart of FIG. 5), which is the situation at the stage of the program presently being described. Condition signal $\overline{v2}$ causes the sequence of commands to branch to a loading phase for auxiliary table unit UTA.

Figure 3B:
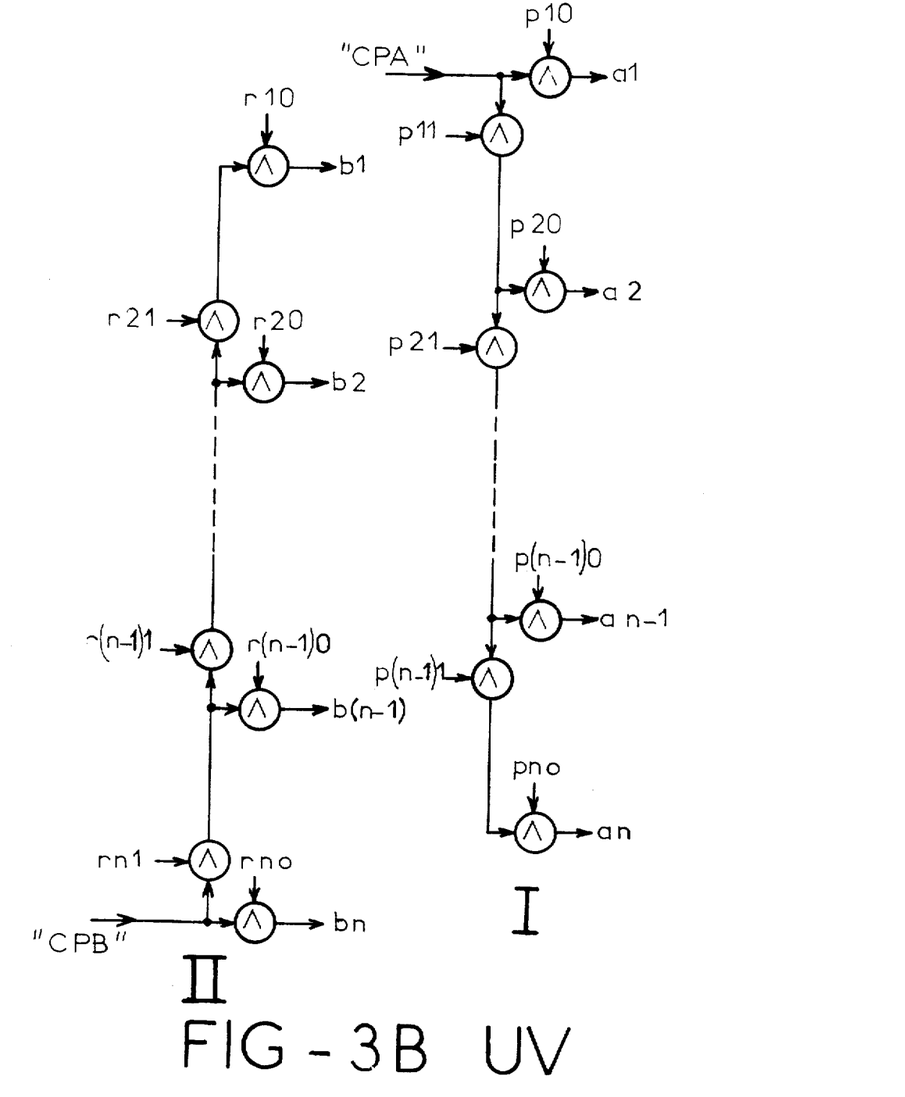

The nodes of the subsequent loading phase are determined by the next order "CPA" and the network I of AND-gates of enabling unit UV, FIG. 3B. The segment identification number, represented by information signals rn, and the corresponding descriptor, represented by information signals ex, of the first segment called are loaded into respective registers S1 and D1 of auxiliary table unit UTA by means of AND-gates (without reference numerals, but illustrated immediately to the left of registers S1 and D1) enabled by a condition signal al, FIG. 4B. Condition signal al is generated when the order "CPA" is applied to the input lead of network I, and network I is at that time enabled by condition signal p10, FIG. 3B, It is to be noted, FIG. 4A, that simultaneously condition signal al sets both presence indicator P1 and reference indicator R1 to state 1.

This process is repeated identically for the n first segments called, except that for the second segment, the order "CPA" results in the loading of registers S2 and D2 of auxiliary table unit UTA. Registers S2 and D2 are loaded through the direction of AND-gates of network I which are enabled by condition signals p11 and p20, etc. The last of the n first segments has its identification number and its descriptor loaded into respective registers Sn and Dn.

In the ensuing program, if the descriptor of a segment called is found to be in auxiliary table unit UTA, such descriptor will be retrieved directly therefrom, because the corresponding presence indicator is found to be in state 1. The presence of the corresponding one of the presence indicator output signals p11–pn1 enables transfer of the corresponding one of comparator output signals c1–cn, FIG. 4B, issuing as a result of the segment number comparison controlled by the order "CNS". The correspondingly generated one of signals c1v–cnv thereupon enables the contents of the corresponding one of descriptor registers D1–Dn to be transferred, as information signals cdv, into process register EX, FIG. 3A. The one of condition signals c1v–cnv that enables the transfer of the corresponding descriptor to register Ex, also sets the corresponding one of reference indicators R1–Rn to state 1 (the reasons for this arrangement appearing hereinafter in this description). The order "CNS", which is also applied to the AND-gate network shown in the lower right portion of FIG. 3A, causes issuance of the condition signal $\overline{v1}$ ("YES", in the flow chart of FIG. 5), by virtue of the AND-gate of such network that is enabled by one of the condition signals c1v–cnv supplied thereto.

However, if in the ensuing program, the order "CNS" generates the information that the descriptor of a segment called is not found to be in auxiliary table unit UTA, as described previously herein, the sequence will be caused to branch to a search of general descriptor table TG. In this instance, the condition signals $\overline{c1}$–$\overline{cn}$ provide for the generation of condition signal v1, FIG. 3A.

The order "TEP", which follows the retrieval of a descriptor from table TG, leads to generation of the condition signal v2 when all of presence indicators P1–Pn are in state 1, FIG. 3A, whereupon the sequence will be caused to branch to a phase for replacing a descriptor.

The descriptor replacement phase starts with a test order "TER", which order tests the state of reference indicators R1–Rn. If any one of indicators R1–Rn is in state 0 (lower left portion of FIG. 3A), the condition signal $\overline{v3}$ issues ("NO", in flow chart of FIG. 5), whereupon the sequence will be caused to branch directly to the descriptor replacement. If all of reference indicators R1–Rn are in state 1, the condition signal v3 issues ("YES", in flow chart of FIG. 5), whereupon the sequence will be caused to branch to the order "ROR" (resetting all reference indicators to the state 0) prior to the descriptor replacement.

The modes of the replacement phase are determined by the next order "CPB" and the network II of AND-gates of enabling unit UV, FIG. 3B. Two cases will be considered:

First case: The order "ROR" has been generated immediately prior to the replacement and all of the reference indicators R1–Rn are in state 0. The identification number and the descriptor of the new segment called will be loaded into registers Sn and Dn of auxiliary table unit UTA through AND-gates enabled by a condition signal bn (the order "CPB" applied to network II, which is at that time enabled by condition signal rn0, provided by indicator Rn being in state 0, causes generation of signal bn, FIG. 3B).

Second Case: The order "ROR" has been generated during an earlier replacement phase and it is assumed that afterwards the segment, whose identification number and descriptor had been initially loaded into registers Sn and Dn, has been called (it has been shown in the preceding description that the direct use of the contents of a descriptor register is accompanied by maintaining in or setting to state 1 the corresponding reference indicator). The identification number and the descriptor of the new segment called may now be loaded into registers S(n-1) and D(n-1), (the order "CPB" applied to network II, FIG. 3B, which is at that time enabled by condition signals rn1 and r(n-1)0, causes generation of signal b(n-1)).

If the operation of the apparatus and process which have been described above are generalized, the following principle may be expressed:

that auxiliary table unit UTA is loaded initially with the descriptors of the first n different segments called;

that each new different segment called gives rise to the storing of its corresponding descriptor in auxiliary table unit UTA and that the modes of descriptor replacement which are imposed are managed according to a separate rule. Thus, the process utilized can be defined as two phases:

a first phase, the aforementioned loading phase, during which the descriptors of the first n different segments called are loaded in order into respective registers of rank 1 through n of auxiliary table unit UTA;

a second phase, the aforementioned replacement phase, during which each segment called (a) causes the "marking" of its corresponding descriptor in auxiliary table unit UTA if such descriptor is found present in unit UTA, and (b) causes the replacement with its corresponding descriptor of the first descriptor in unit UTA not "marked" counting from descriptor register $n$ through 1 if such corresponding descriptor is not found present in unit UTA.

This apparatus takes into account a certain number of observations which include, among others: that the first segments called at the beginning of a program have the tendency to be utilized with relatively regular frequency; and during the course of the program, the segments which are the most recently called have the tendency to be called immediately thereafter.

Therefore, these observations were among reasons for establishing a procedure such as described herein in which, in the loading phase, descriptors are loaded in order into registers D1 through Dn of the auxiliary table unit, and in the replacement phase, descriptors are entered in the opposite sense; i.e., descriptors are replaced starting from register Dn. The number $n$ may be the result of a compromise between the variations of the frequency of utilization of the first segments called and the lowest value that it must have relative to $m$ in order to justify the cost of the apparatus.

In practice, the apparatus and the process of the invention applied to a data processing system have led to selecting the number 8 for the number of descriptor registers in the auxiliary table unit. The time of searching for the descriptors is thereupon reduced by 13 to 1.

It is to be understood that the preceding description has been made by reference to a single nonlimiting example and that the variations of the invention may be directed especially to: the number of descriptor registers of the auxiliary table unit; the mode of controlling the apparatus; the possibility of preventing the replacement of a particular descriptor the concept of the reference indicators (which can make allowance for the frequency of use of the segments whose descriptors are held in the auxiliary table unit); the embodiment of the presence and reference indicators (which may be constituted of registers having $n$ positions); and/or the possibility of replacing a descriptor of rank $i$, wherein $1 \leq i \leq n$, by simultaneously resetting to state 0 indicators Pi and Ri; all of which may be implemented without departing from the heart of the invention.

We claim:

1. Apparatus for the rapid processing of segmented data in a data processing system wherein the memory unit is divided into $m$ addressable segments, each segment being assigned an identification number, wherein the characteristics of each segment are stored in a respective segment descriptor forming part of a general descriptor table, said table being stored in registers of said system and wherefrom said descriptors are retrieved successively by means of the identification numbers of the corresponding segments, said identification numbers being provided successively by a processing unit of said system, said apparatus comprising:

an auxiliary table unit, having evolving contents, for $n$ descriptors, $n$ being relatively small compared to $m$, a control unit, having evolving contents, and comprising two banks of indicators, one of said banks comprising a presence indicator bank for denoting the presence of the $n$ descriptors contained in said auxiliary table unit, and the other of said banks comprising a reference indicator bank for identifying A different segments called during the course of an addressing, wherein A is less than or equal to $n$, means including a transfer network and an enabling unit, said means being operatively connected to said auxiliary table unit, said control unit, and said processing unit, said transfer network being responsive to commands emitted in sequence by the command unit of said processing unit for enabling the validation of the presence of predetermined segment descriptors in the auxiliary table unit, by testing the state of the presence indicator bank and the state of the reference indicator bank, to determine the need for transferring said descriptors into said auxiliary table unit, and said enabling unit being responsive to said validation for steering the entry of said descriptors into said auxiliary table unit.

2. The apparatus of claim 1, wherein said auxiliary table unit comprises:

$n$ segment descriptor registers, $n$ segment identifier registers, each of said segment identifier registers being associated with the one of said descriptor registers which holds the descriptor of the segment for which said identifier register holds the identification number, $n$ comparators, each of said comparators having two output states representing respectively identification and nonidentification, each of said comparators being coupled to the output of one of said identifier registers, a first network of $n$ AND-gates coupled to the outputs of said descriptor registers for transferring to said processing unit, under the control of said comparators, the contents of the descriptor registers which correspond to the identification numbers provided successively by said processing unit, a second network of $n$ AND-gates coupled to the outputs of said comparators for placing said transferring of the contents of said descriptor registers to said processing unit under the control of said presence indicator bank of said control unit, and third and fourth networks of $2n$ AND-gates each, coupled, through two inputs per register, respectively to the inputs of said descriptor registers and said identifier registers for placing the transfer of said segment descriptors and of the corresponding identification numbers to said registers under the control of said enabling unit.

3. The apparatus of claim 2, wherein said presence indicator bank of said control unit comprises $n$ presence indicators, each of said presence indicators being assigned to one of said descriptor registers, to the corresponding one of said identifier registers and to the one of said comparators coupled to the output of said corresponding identifier register, each of said presence indicators comprising an element whose contents change between one and the other of two states; namely, a state denoting that the descriptor is present, which constitutes the condition for enabling said second network of AND-gates of said auxiliary table unit and a state denoting that the descriptor is absent, said two states of said presence indicators comprising steering conditions for said enabling unit.

4. The apparatus of claim 3, wherein each of said presence indicators of said control unit comprises a flip-flop.

5. The apparatus of claim 3, wherein said presence indicator bank comprises a register having $n$ positions.

6. The apparatus of claim 3, wherein said reference indicator bank of said control unit comprises $n$ reference indicators, each of said reference indicators being assigned to one of said descriptor registers, the corresponding one of said identifier registers and the one of said comparators coupled to the output of said corresponding identifier register, each of said reference indicators comprising an element whose contents change between one and the other of two states; namely, a state denoting that the descriptor is to be saved and a state denoting that the descriptor is replaceable, said two states of said reference indicators comprising steering conditions for said enabling unit.

7. The apparatus of claim 6, wherein each of said reference indicators of said control unit comprises a flip-flop.

8. The apparatus of claim 6, wherein said reference indicator bank of said control unit comprises a register having $n$ positions.

9. The apparatus of claim 6, wherein said enabling unit comprises fifth and sixth networks of AND-gates, each of said fifth and sixth networks comprising:
an input branch of $n-1$ serially connected AND-gates,
$n$ parallel output branches, each comprising one AND-gate, coupled respectively to the input end, the output end, and the nodes of said input branch,
said fifth network being employed as a loading network whose $n-1$ AND-gates of said input branch are respectively coupled to be enabled, from said input end to said output end, by signals representing said presence indicator states which denote that a descriptor is present for the presence indicators assigned to the 1st through $n$-1th descriptor registers, and whose $n$ AND-gates of said output branches are respectively coupled to be enabled, in a direction from said input end to said input end of said input branch, by signals representing said presence indicator states which denote that a descriptor is absent for the presence indicators assigned to the 1st through nth descriptor registers.
said sixth network being employed as a replacement network whose $n-1$ AND-gates of said input branch are respectively coupled to be enabled, from said input end to said output end by signals representing said reference indicator states which denote that the descriptor is to be saved for the reference indicators assigned to the nth through 2nd descriptor registers, and whose $n$ AND-gates of said output branches are respectively coupled to be enabled, in a direction from said input end to said output end of said input branch, by signals representing said reference indicator states which denote that the descriptor is replaceable for the reference indicators assigned to the nth through 1st descriptor registers,
the output lead of each AND-gate of said output branches being coupled respectively to one of the AND-gates of said third AND-gate network and one of the AND-gates of said fourth AND-gate network of said auxiliary table unit for steering the transfer of segment descriptors and corresponding identification numbers into the ones of said segment descriptor registers and corresponding segment identifier registers whose corresponding presence and reference indicators provide enabling signals for said output branches.

10. The apparatus of claim 9, wherein said transfer network comprises:
a first series chain of $n$ AND-gates, the gates of said first chain being enabled respectively by signals representing said comparator output states which denote nonidentification,
a second series chain of $n$ AND-gates, the gates of said second chain being enabled respectively by signals representing said presence indicator states which denote that a descriptor is present,
a third series chain of $n$ AND-gates, the gates of said third chain being enabled respectively by signals representing said reference indicator states which denote that the descriptor is to be saved,
the output leads of each of said first, second and third chains being coupled to said processing unit, whereby said first chain initiates a search in said general descriptor table and provides for storing the descriptor retrieved from said descriptor table in said auxiliary table unit under control of said fifth network of the enabling unit, said second chain places the storing of said retrieved descriptor in said auxiliary table unit under control of said sixth network of the enabling unit, and said third chain initiates the transfer of said $n$ reference indicators to the state representing that the descriptor is replaceable.

11. A supervisory process for the rapid processing of segmented data for use in a data processing system wherein the memory unit is divided into $m$ addressable segments, each segment being assigned an identification number, wherein the characteristics of each segment are stored in a respective segment descriptor forming part of a general descriptor table, said table being stored in registers of said system and wherefrom the descriptors are retrieved successively by means of the identification numbers of the corresponding segments, said identification numbers being provided successively by means under control of said supervisory process which comprises the steps of:
storing the descriptors of the segments called in an auxiliary table unit of $n$ descriptor registers, $n$ being relatively small compared to $m$, according to two phases:
a first phase, termed the loading phase, in the course of which the storing of the descriptors of the $n$ first different segments called is made in registers of rank 1 to $n$ of said auxiliary table unit, respectively, and
a second phase, termed the replacement phase, during which each segment called (a) causes the establishment of an indicium related to the descriptor corresponding to said segment called if said corresponding descriptor is present in said auxiliary table unit, this establishment of an indicium being the result of a comparison between the identification number related to the segment called and the identification numbers related to the descriptors in said table unit, and (b) if said corresponding descriptor is not present in said auxiliary table unit, causes the replacement of a descriptor for which a related indicium has not been established in the auxiliary table, unit by said corresponding descriptor, this replacement beginning from and descending from the register containing the descriptor of rank $n$.

12. A method for controlling access to the memory of a data processing system, wherein said memory is organized into a plurality of separately identifiable portions, wherein for each of said memory portions there is provided a descriptor that represents selected characteristics of said memory portion, and wherein there is provided a storage element for each of *n* of said descriptors, said storage elements being designated in order as the 1st to the nth storage elements, comprising:

the first step of entering in order into said 1st to said nth storage elements the respective descriptors of the first *n* different memory portions called; and the second step, which follows entry of a descriptor into said nth storage elements of said first step, of establishing an indicium denoting that the respective descriptor of each memory portion called when said descriptor is found in one of said storage elements should be saved, and of entering in order into the ones of said nth to said 1st storage elements for which the descriptors held are not denoted for saving the respective descriptors of the memory portions called when said descriptors are not found in said storage elements.

13. The method of claim 12 further comprising a third step, which follows entry of a descriptor into said 1st storage element of said second step, of clearing all of said indicia denoting the saving of descriptors and then repeating said second step.

14. The method of claim 13, wherein said first step further comprises establishing an indicium denoting that a respective one of said storage elements if occupied when a descriptor is entered into said one storage element.

15. Apparatus for controlling access to the memory unit of a data processing system, wherein said memory unit is organized into a plurality of separately identifiable portions, wherein for each of said memory portions there is provided a descriptor that represents selected characterictics of said memory portion, comprising:

a table for storing said descriptors;

*n* storage elements, each of said storage elements being adapted to hold one of said descriptors, said storage elements being designated in order as the 1st to the *n*th storage elements, a presence indicator for each of said storage elements, each of said presence indicators being adapted to operate in either one of two states, the first of said presence indicator states denoting that the corresponding storage element is empty and the second of said presence indicator states denoting that the corresponding storage element is occupied, a reference indicator for each of said storage elements, each of said reference indicators being adapted to operate in either one of two states, the first of said reference indicator states denoting that the descriptor held in the corresponding storage element is replaceable and the second of said reference indicator states denoting that the descriptor held in the corresponding storage element must be saved, (first setting means for transferring the presence and reference indicators of a storage element to their respective second states when a descriptor is entered into the corresponding storage element,)

first storing means enabled during the calling of the first *n* different memory portions for entering in order into said 1st to said nth storage elements the respective descriptors of said first *n* different memory portions from said table;

resetting means enabled following the entry of a descriptor into said nth storage element during said calling of said first *n* different memory portions for transferring all of said reference indicators to their respective first states, and setting means following said transfer of all of said reference indicators to the first state for transferring to the second state the reference indicator of each storage element whose descriptor held is that of a memory portion called, and for entering in order into said nth to said 1st storage elements for which the corresponding reference indicators are not in the second state the respective descriptors of the memory portions called when said descriptors are not held in said storage elements.

16. The apparatus of claim 15 further comprising means for controlling said resetting means to transfer all said reference indicators to their respective first states after a descriptor has been entered into said 1st storage element during the entering of descriptors in order into said nth to said 1st storage elements.

* * * * *